United States Patent [19]

Losert

[11] 4,192,564
[45] Mar. 11, 1980

[54] LOAD EQUALIZING SUPPORT SYSTEM

[75] Inventor: Gerhard K. Losert, Louisville, Ky.

[73] Assignee: General Electric Company, Louisville, Ky.

[21] Appl. No.: 959,546

[22] Filed: Nov. 13, 1978

[51] Int. Cl.² ............... F16M 11/24; B60B 33/00
[52] U.S. Cl. ............... 312/253; 312/250; 312/331; 248/677; 248/188.3
[58] Field of Search ............... 312/253, 331, 110, 347, 312/250; 248/677, 188.3, 674; 16/19, 35, 29, 31

[56] References Cited

U.S. PATENT DOCUMENTS

| | | | |
|---|---|---|---|
| 2,540,750 | 2/1951 | Morrison | 248/677 |
| 2,695,147 | 11/1954 | Castricone | 248/677 |
| 2,803,510 | 8/1957 | Carbary | 16/19 |
| 3,071,887 | 1/1963 | Von Arb | 312/253 |
| 3,222,021 | 12/1965 | Sisler | 248/188.3 |
| 3,656,203 | 4/1972 | Waflart, Jr. | 16/35 |
| 3,880,388 | 4/1975 | Beguin | 248/188.3 |
| 3,954,241 | 5/1976 | Carlson | 248/188.3 |
| 4,038,717 | 8/1977 | Greathouse | 16/29 |
| 4,102,556 | 7/1978 | Webb | 312/250 |
| 4,124,187 | 11/1978 | Webb | 248/188.3 |

*Primary Examiner*—Victor N. Sakran
*Attorney, Agent, or Firm*—Frank P. Giacalone; Frederick P. Weidner

[57] ABSTRACT

A refrigerator cabinet is supported at the rear corners by vertically adjustable legs and at the front by a pair of widely-spaced front wheel assemblies that are connected through a self-leveling system. Movable members associated with each of the wheel assemblies are connected by a rod that serves to cause each movable member to urge its corresponding wheel assembly downwardly with like force. When the cabinet is placed on an uneven supporting surface, the wheel assemblies move up and down until the forces supported by each are equal.

3 Claims, 4 Drawing Figures

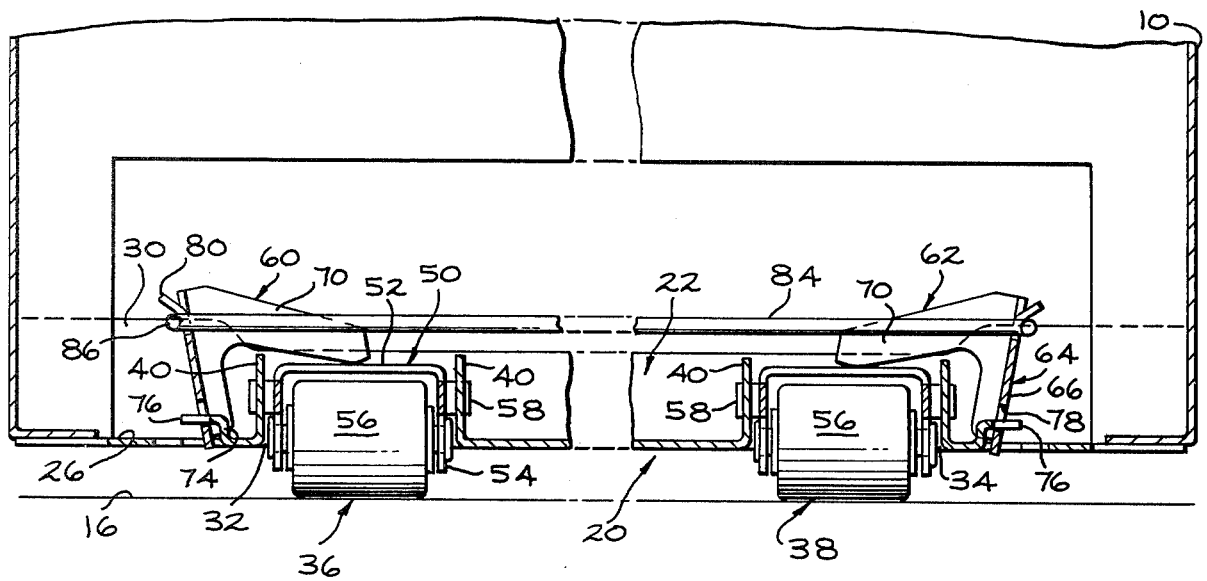
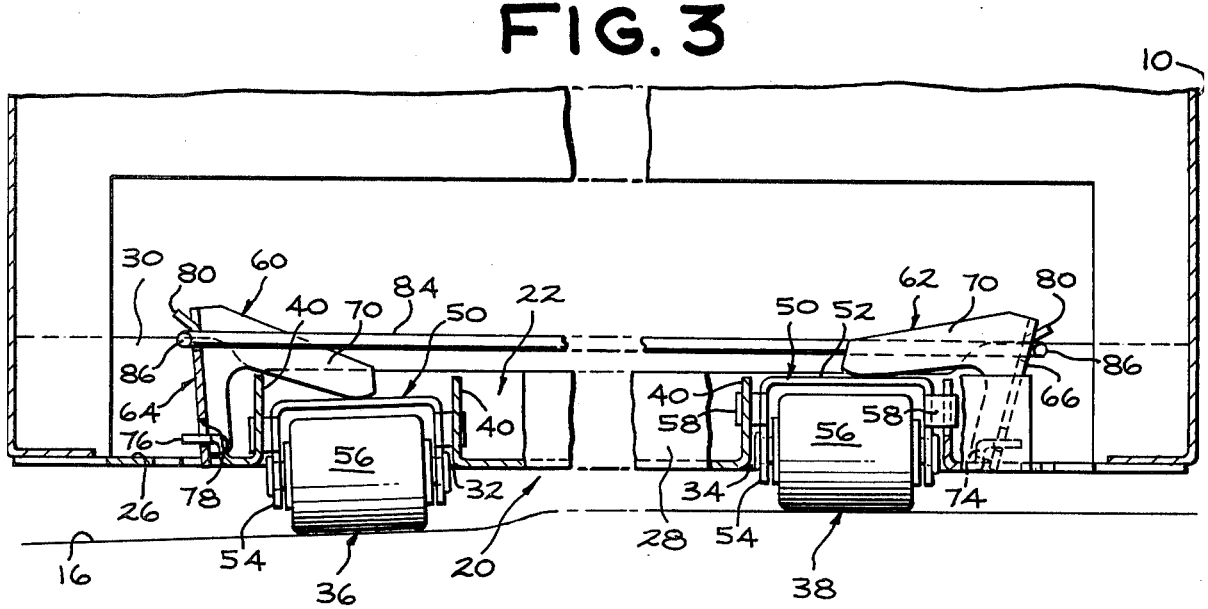

LOAD EQUALIZING SUPPORT SYSTEM

BACKGROUND OF THE INVENTION

This invention relates to self-leveling systems and more particularly to a refrigerator cabinet support that will maintain the cabinet level on a surface that is slanted, unlevel, or out-of-flat in such a way that there is equal weight distributed at the two front corners.

It is highly desirable that appliances generally be provided with adjusting means to insure that all four support feet are firmly positioned on the floor and the appliance level on the floor even when the floor or surface itself is unlevel or out-of-flat.

Frequently, appliances such as washing machines and refrigerators, are placed on sloping surfaces. Usually, manually adjustable supports are affixed to the front underside of the cabinets of the appliances. These supports are individually adjustable so that they can be employed for compensating for slope in a supporting surface from front to back and also for slope from side to side. The front supports, usually two in number, must often be adjusted to unequal lengths to compensate for the side-to-side slope in the supporting surface. Where the cabinet has two fixed rear supports, the cabinet may then rock on three of its four supports. In the case of an appliance such as a washing machine, this may result in undesirable "walking." Of potentially greater concern, the weight of the cabinet may cause twisting of the cabinet to bring all four supports into engagement with the supporting surface. This is particularly of concern in a refrigerator cabinet for it is very heavy when a normal amount of food is stored therein. Because a refrigerator cabinet is tall and not as rigid as more compact cabinets, it has a greater tendency to twist when not supported on all of the supporting elements. This twisting action of the cabinet may cause distortion of the front face of the cabinet against which the door closes and thereby prevent the door from properly sealing its gasket with respect to this front face of the cabinet. Without proper sealing, heat will leak into the refrigerator's cooling compartment and result in inefficient refrigeration and waste of electrical energy. Moreover, in the case of refrigerator-freezers which have two doors, either one above the other or side by side, this twisting may prevent the doors from lining up well enough to be aesthetically acceptable.

Since the above-mentioned appliances are heavy and are often placed in confined areas, it is difficult or impossible to provide access to the rear supports for adjusting such supports to compensate for a sloping surface, particularly one which slopes from side to side. Hence, it is important to provide a means for effecting automatic adjustment of a rear support of the cabinet of the appliance to conform to the adjustment of the front supports in order that the cabinet may be uniformly supported, front and back, in an upright position, and to do this without requiring access to the rear supports.

The problem of providing self-adjusting supports for facilitating the leveling of appliances such as refrigerators and washing machines when such appliances are positioned on sloping floor surfaces is well-known, and the prior art discloses many examples of self-adjusting assemblies adapted especially for facilitating the leveling of such appliances without requiring access to the rear support structure and without requiring the use of manual procedures or tools. For example, U.S. Pat. No. 3,954,241 teaches a self-adjusting assembly especially adapted for facilitating the leveling of an appliance, such as a washing machine or the like, on a sloping floor in order that the appliance be firmly positioned thereon. The assembly includes a pair of brackets located at the two rearmost, lower corners of an appliance, and a flexible cable element extending from one bracket to the other. Each bracket is provided with an independently adjustable leg member, with the members being interconnected by the cable. If both rear legs do not engage the floor, the leg which first engages the floor is forced upwardly by the weight of the cabinet. Through the cable, this causes a corresponding downward movement of the other leg until it is brought into engagement with the floor.

Another example of a support with automatic adjustment is taught by U.S. Pat. No. 3,880,388. The support is of the leg-type, comprising two vertically movable legs coupled together, in one embodiment, by a chain of rigid thrust elements encased by a tubular guide. These elements are arranged such that as the weight of the supported structure causes one leg, which engages the surface upon which the structure is placed, to move upwardly, the other leg is urged downwardly until it engages the surface.

Still another example of a support with automatic adjustment is taught by the U.S. Pat. No. 2,695,147. The support includes a pair of cams at the rearmost corners of an appliance, which cams are connected together by a connecting rod. The cams are shaped to slope in opposite directions and are arranged for rotation about vertical axes. The cams are rotatably connected to plungers which support the cams, the plungers forming feet or legs which actually support the appliance on a floor or other surface. If greater pressure is applied to one of the plungers than is applied to the other, the cam in engagement with the plunger having the greater pressure applied thereto tends to rotate about a vertical axis so as to shorten that plunger relative to the base of the appliance. This rotation is transmitted through the connecting rod to the other cam and causes rotation of this other cam in a corresponding direction, but, because of the opposite slope of the cams, this tends to lengthen the plunger connected thereto relative to the base. This produces an equalizing action that automatically provides uniform support for the appliance on the supporting surface.

In lieu of leg-type supports, some prior art cabinet structures employ a single, rear roller-type support in combination with two adjustable front supports. If a single roller-type support is utilized, it is necessary to provide a roller of reasonable length to assure adequate stability of the rear portion of a cabinet. This is especially important where the supporting surface is a soft floor covering. If the weight of the rear portion of the cabinet is supported on a short roller, this may result in a substantial depression in the supporting surface. Such depression, aside from marring the appearance of the floor covering, would hinder the moving of the appliance from the confined space. However, where the two front supports are adjusted to unequal lengths on a floor which slopes from side to side and a roller of adequate length is employed, another problem is encountered in that one end of the rear roller may engage the floor covering and tend to press into the soft floor covering. A U.S. Pat. No. 4,102,556-William M. Webb is directed to this particular problem.

Some prior art cabinet structures, for example, that shown in U.S. Pat. No. 3,222,021 employ a mechanism comprising two oppositely sloped ramps in lieu of leg-type supports. The ramps are formed at the two rear corners of a cabinet and the cabinet is supported on these ramps in such a manner that a slight sideward movement of the cabinet results in one rear corner sliding up one ramp and the other rear corner sliding the same distance down the opposite ramp. The ramp construction provides substantial resistance to movement at the rear corners. This ramp-type support is frequently utilized with washing machines because washing machines usually shake while spin drying, and the friction of the ramp is quite helpful in preventing unwanted rocking while being easily overcome for automatic adjustment during a spin cycle. However, since refrigerators shake very little and since refrigerator cabinets are tall and not as rigid as more compact cabinets, such as washing machine cabinets, and, therefore, have a greater tendency to twist, the rear support should be able to adjust with very little frictional resistance. Hence, the ramp-type support, with its substantial friction, is not particularly useful in supporting refrigerator cabinets on surfaces which slope from side to side.

One example of which the present invention is an improvement is U.S. Pat. No. 2,540,750-Morrison issued Feb. 6, 1951, wherein automatically adjustable legs are mounted on bearings attached to the appliance to permit vertical movement relative thereto. Cranks, each having a horizontally disposed arm bearing on the top of one of the legs and a vertically disposed arm extending downwardly, are pivotally supported from the appliance. A bar is pivotally attached to the two downwardly extending crank arms to cause each crank to urge its corresponding leg downwardly with like force. The bar is tensioned by increased load and when the appliance is placed upon an uneven or tilted supporting surface, the legs move up and down until the forces supported by each are equal.

One problem with such prior art self-adjusting leg-type support is that the mechanisms employed are of expensive and complex construction due to the use of many parts and to the functional relationships of these parts.

By this invention, these disadvantages and limitations of the prior art are overcome, and a support for cabinets, such as refrigerators and washing machines, is provided which is simple in construction, which can be manufactured economically and which readily and automatically adjusts itself for uniformly supporting the cabinet on a surface which slopes from side to side.

Accordingly, it is an object of this invention to provide an improved construction of a rear support structure for a cabinet which automatically adjusts itself to a supporting surface sloping from side to side.

It is another object of this invention to provide such a rear support structure which proportionately distributes the weight of the rear of the cabinet to insure that all four corners of the cabinet will be uniformly supported on the supporting surface to prevent any rocking or twisting.

SUMMARY OF THE INVENTION

This invention is directed to a load equalizing support structure for uniformly supporting an appliance cabinet on a supporting surface which slopes from side to side. The support structures include a bracket that extends across the lower end of one side wall of the cabinet. The lower wall of the bracket is provided with spaced apart openings that have upwardly extending flange portions adjacent opposite side of the openings. A wheel assembly is arranged for vertical movement in each of the openings. The wheel assembly includes a generally U-shaped housing having a wheel supported between the legs thereof. The wheel assembly is arranged for vertical movement with the axis of the wheel being maintained parallel with the supporting surface.

A member is associated with each of the wheel assemblies that maintains the cooperating wheel assembly in its respective bracket opening. The member includes a first portion having a segment in engagement with the housing for transmitting a force on the housing substantially perpendicular to the axis of the wheel and a second portion engaging locating means on the bracket. A connecting member is connected to each of the members at a point intermediate the first and second portions thereof. This arrangement transmits movement between the members in the same direction, whereby when one of the wheel assemblies raises to move one of the members by its movement relative to the supporting surface, the other member moves to cause a lowering of the other wheel assembly relative to the surface with the axis of both of the wheels being parallel to the surface.

BRIEF DESCRIPTION OF THE DRAWINGS

FIG. 2 is a rear elevational view showing the elements on a level support surface;

FIG. 3 is a view similar to FIG. 2 but showing the elements on an uneven support surface.

DESCRIPTION OF THE PREFERRED EMBODIMENT

Figure 1:
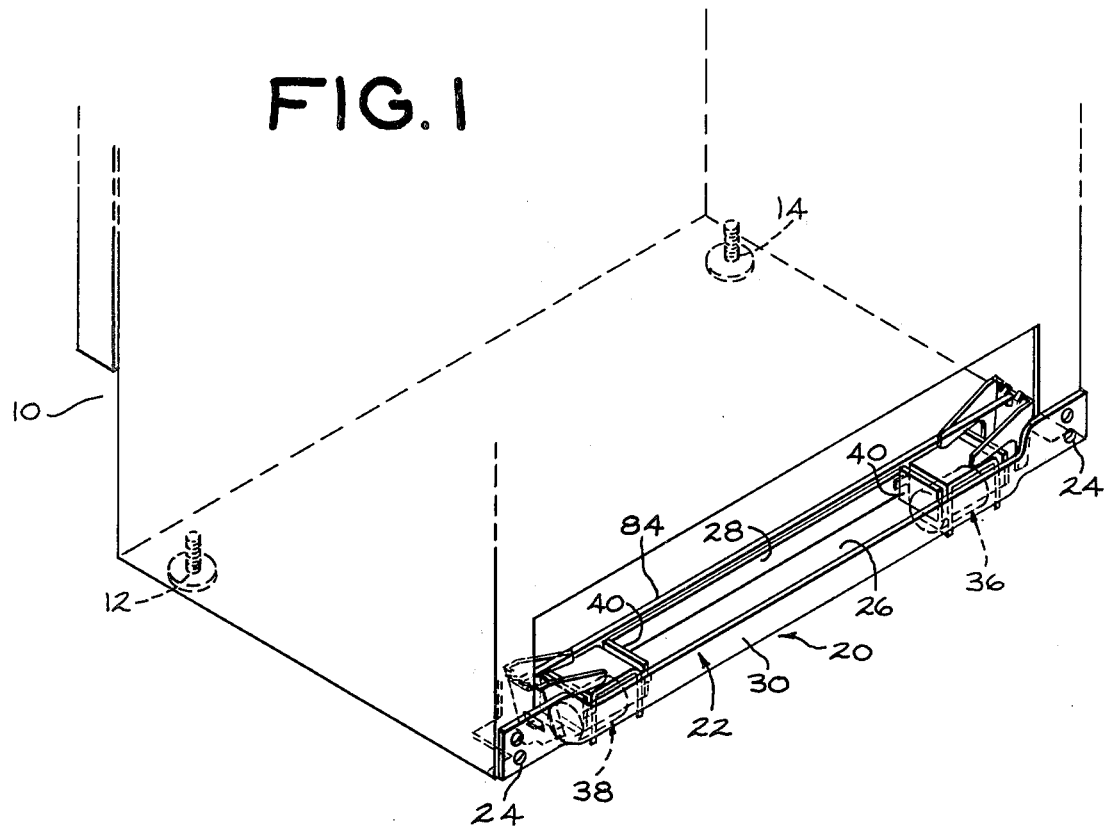
FIG. 1 is a partial perspective view of the lower portion of a refrigerator cabinet incorporating the support system of the present invention.

Referring to the drawings, there is shown in FIG. 1 a portion of a refrigerator cabinet 10. At the front lower corners of the cabinet 10 are disposed a pair of independently adjustable threaded supports 12 and 14 for adjusting the front of the cabinet 10 to compensate for any slope of the floor or other supporting surface 16 as shown in FIGS. 2 and 3. The adjustable threaded supports 12 and 14 may be of conventionally type, including ones having rollers, and have not been shown in detail since they do not form part of the present invention.

Insofar as the front of the refrigerator is concerned, the independently adjustable supports 12 and 14 can be employed to compensate for the slope of the floor 16, both in a back-to-front direction and in a side-to-side direction. Thus, if the floor should slope from back-to-front of the cabinet, for example, it is merely necessary to adjust both supports 12 and 14 by equal amounts until the cabinet 10 is level. If the floor slopes to the left, then the left (as viewed from the front of the cabinet) front support 14 is adjusted to a greater length than the right front support 12 to compensate for the slope of the floor and thereby support the front of the cabinet in a level position. However, in the usual case, the cabinet, such as a refrigerator, is placed in a confined space where access to the rear of the cabinet is difficult or impossible. It is, therefore, unsatisfactory to use manually adjustable supports at the rear of the cabinet because of the difficulty or impossibility of obtaining access to such rear supports. If, on the other hand, two fixed supports are employed at the rear corner, it will be appreciated that on a floor which slopes from side-to-side the cabinet will tend to rock on three of the four supports. Alternatively, the cabinet may tend to distort or twist in order to bring all four supports into engagement with the floor. This is particularly so in the case of relatively tall appliances such as refrigerators and significant distortion or twisting of the refrigerator cabinet may result in unsatisfactory sealing of the refrigerator door.

In the present invention, the rear support structure is formed in a manner which overcomes all of these problems. This is done by providing a rear support structure 20 which includes provision whereby the support structure automatically adjusts itself so as to engage the floor regardless of the slope of the floor.

Figure 4:
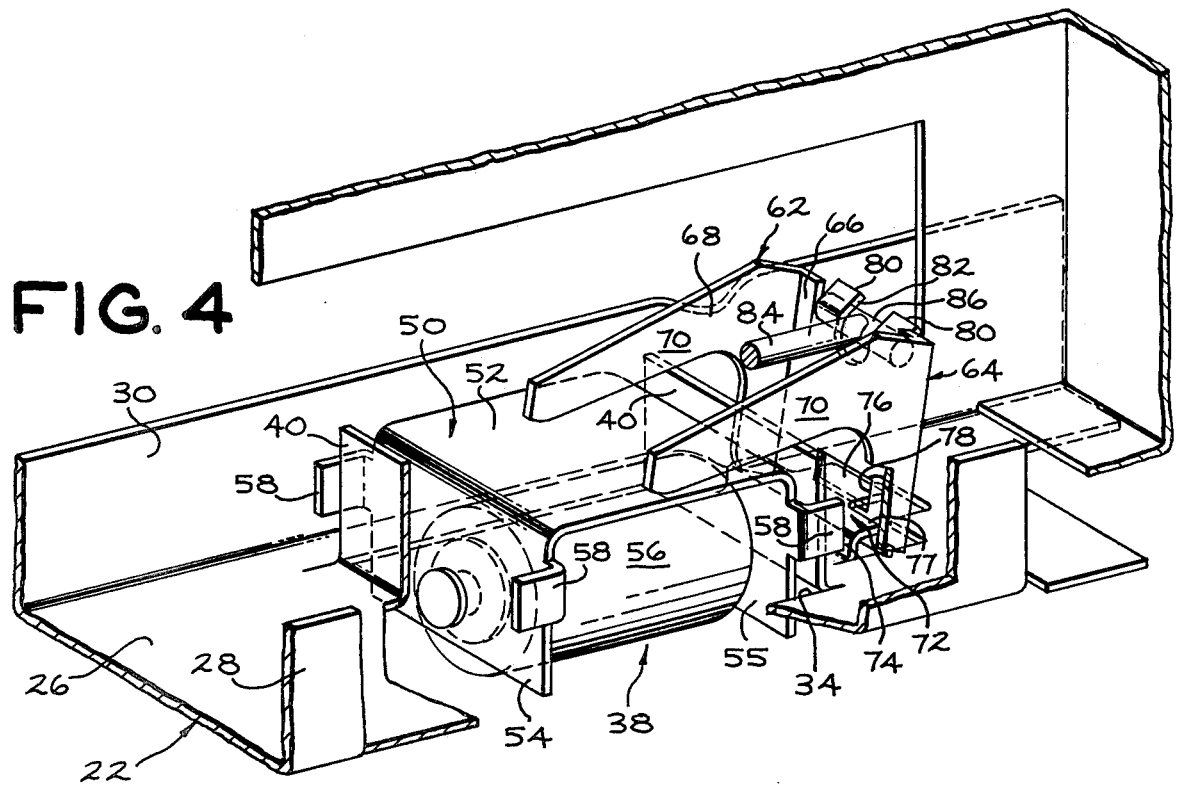
FIG. 4 is an enlarged perspective view showing one the cooperating parts of one portion of the support system.

Referring to FIGS. 1, 2 and 3, the rear support structure 20 comprises a mounting means or channel shaped bracket 22 which extends transversely of the cabinet 10 and is affixed to the rear side wall of the cabinet adjacent the bottom thereof as by fastening means 24. The channel 22 comprises a bottom wall 26 and side walls 28 and 30. In the bottom wall 26 of the channel 22, adjacent the right and left ends thereof, are rectangular apertures 32 and 34 (FIGS. 2, 3 and 4) respectively for receiving therethrough leveling elements or wheel assemblies 36 and 38 respectively which support the rear of the cabinet 10 on the supporting surface 16. The bottom wall 26 of channel 22 is formed adjacent the longitudinal sides of apertures 32 and 34 to provide oppositely disposed guide means or flanges 40 extending upwardly substantially perpendicular to wall 26 for as will be explained hereinafter guiding vertical movement of the cooperating wheel assemblies 36, 38. The assemblies 36 and 38 are identical and accordingly one will be explained with like parts having the same reference numerals. The assembly 38, as shown in FIG. 4, comprises a housing 50 having a generally U-shaped configuration including a central upper wall 52 and downwardly extending spaced apart legs or side walls 54 and 55. A wheel or roller 56 is rotatably mounted between the downwardly extending legs 54 and 55. Extending outwardly from the vertically disposed edge portions of legs 54 and 55 are tabs 58. With reference to FIG. 4, it will be seen that the width of the legs 54 and 55 of housing 50 and the dimension between tabs 58 are substantially the same as the width of flanges 40; accordingly, the outwardly extending tabs 58 provide a channel in which the flanges 40 are located. This arrangement allows vertical movement of assembly 38 relative to the bracket 22 while, at the same time, preventing rotation of the assembly 38 relative thereto.

The present configuration of parts for arranging the wheel housing 50 relative to the cabinet 10 through bracket 22 allows movement of the wheel assembly along a vertical axis so that the axis of the wheel 56 is always parallel to the supporting surface 16 while, at the same time, preventing movement of the wheel assembly about the vertical axis in a plane defined by the axis of the wheel 56.

The assemblies 36 and 38 are interconnected by movable members 60 and 62 respectively that, as will be apparent from the foregoing description, also function to maintain the assemblies 36 and 38 in their respective apertures 32 and 34. Each of the members 60 and 62 includes a first portion 64, including a central vertically arranged section 66, and a second portion 68 including a pair of parallel arranged arms 70 extending from either side of the central section 66. The portions adjacent the distal ends of the arms 70 engage the upper surface of central portion 52 of housing 50. The spaced arms 70 engage the housing at two points to stabilize vertical movement of the housing 50. The members 60 and 62 are arranged for movement relative to the bracket 22. To this end, the lower wall 26 of bracket 22 includes a holding means 72 which includes a section 74 extending upwardly from wall 26 and a central portion or tab 76 extending outwardly from a portion 77 arranged parallel to the wall 26. Located adjacent the lower distal end of portion 66 is an aperture 78 dimensioned to receive the tab 76. As can be seen, the provision of holding means 72 and aperture 78 provides a pivot arrangement for the movable members 60, 62 that does not require exacting dimension or machining relative to the cooperating relationship between the members 60, 62 and the cooperating wheel assemblies 36 and 38.

The members 60 and 62 are further provided with tangs 80 located at the upper portion of section 66 intermediate the first and second portions 64 and 68 respectively. The tangs 80 are formed to include a slot or central opening 82. A rod 84 extending between the members 60 and 62 is provided with portions 86 at each end extending at right angles thereto. The portion 86 of the rod 84 is arranged in the slot 82 with the portions 86 bearing on the outside portion of the tangs 80. Further, as seen in FIGS. 2 and 3, the actual pivot is about the contact surface of section 66 and the end edge of portion 77 so that a minimum wear area is provided.

In the view of FIG. 2 the members 60, 62 are shown in the position corresponding to a level support surface 16. As will be evident from this view, the two wheel assemblies 36 and 38 extend an equal distance about the surface 26 of bracket 22 and bear against the distal ends of arms 70 of members 60 and 62 respectively. Since member 60 tends to rotate in a clockwise direction by reason of the upward force exerted by wheel assembly 36 and the member 62 tends to rotate in a counterclockwise direction by reason of the upward forces exerted by the assembly 38, the rod 84 is in tension and holds both of the assemblies 36 and 38 in position.

In the view of FIG. 3, however, the mechanism is shown for the condition wherein the support surface 16 is not level. In this case, the forward legs 12 and 14 are individually adjusted to align the cabinet in a vertical direction. The wheel assemblies 36 and 38 thereupon assume positions corresponding with this alignment with the axis of the wheels parallel to the support surface. The wheel assembly 38 is shifted upwardly relative to the bracket 22 and rotates member 62 in the clockwise direction. This pulls rod 84 and rotates the member 60 in the same direction, thereby forcing the wheel assembly 36 downwardly until the supporting effort by wheel assembly 36 is equal to that of wheel assembly 38.

From the above description, it can be seen that an effective load equalizing support system has been provided that utilizes the support channel 22 that is customarily arranged on the cabinet, together with the wheel assemblies 36, 38, their cooperating movable members 60, 62 and the rod 84. This arrangement of parts lends itself to a load leveling assembly that is easily assembled during manufacture of the refrigerator without adjustments or the use of tools. With the bracket 22 in place on cabinet 10, the wheel assemblies 36 and 38 are placed in their respective apertures 32 and 34. Their cooperating movable members 60 and 62 are then arranged relative thereto with the aperture 78 mounted on the holding apertures 32 and 34 in the channel 22. With the wheel assemblies positioned in the apertures and arranged for vertical movement with respect to the guide provided by the tabs 58 cooperating with the flanges, the next step in assembling the system is to place the members 60, 62 relative to their respective wheel assemblies 36, 38 so that the apertures 78 on the portions 66 are positioned on their respective tabs 76. The final step is placing the rod 84 so that its end portions 86 engage the tangs 80. All of the above steps, as mentioned hereinbefore, are carried out without the assistance of tools with the entire system held in position relative to the cabinet 10 by the rod 84.

It should be apparent to those skilled in the art that the embodiment described heretofore is considered to be presently preferred form of this invention. In accordance with the Patent Statutes, changes may be made in the disclosed apparatus and the manner in which it is used without actually departing from the true spirit and scope of this invention.

What is claimed is:

1. A leveling assembly for supporting an appliance or the like on a surface, said assembly comprising:
    A. a bracket secured to and extending across the lower end of one side wall of said appliance, said bracket including;
        (1) a lower wall portion having spaced apart openings,
        (2) flange portions formed adjacent opposite longitudinal sides of said openings and extending upwardly therefrom;
    B. a wheel assembly mounted in said bracket openings being arranged for vertical movement relative to said bracket, said wheel assembly including;
        (1) a generally U-shaped housing having a central portion connecting leg portions extending substantially perpendicular thereto,
        (2) means supporting said wheel rotationally between said leg portions,
        (3) tab portions extending outwardly from the vertically disposed edge portion of said leg portions dimensioned to provide a guideway for said flange portions to permit movement of said wheel assembly through said opening relative to said flange portions along a vertical axis while maintaining the axis of said wheel parallel with said surface and for preventing movement of said wheel assembly about said vertical axis in a plane defined by the axis of said wheel;
    C. a member associated with each of said wheel assembly housings being pivotally mounted in said bracket for maintaining the wheel assemblies in their respective bracket openings including;
        (1) a first portion having pivoting means including locating means dimensioned to engage holding means in the lower wall portion of said bracket for allowing pivotal movement of said member relative to said bracket; and
        (2) a second portion having a segment in engagement with the central portion of said housing for transmitting a force on said housing substantially perpendicular to the axis of said wheel;
    D. connecting means having means at each end portion arranged in said members at a point intermediate said first and second portions for transmitting movement therebetween for causing rotational movement of said members about its pivot in the same direction, whereby when one of the wheel assemblies raises to move one of said members by its movement relative to said surface, the other member moves to cause a lowering of the other wheel assembly relative to said surface with the axis of both of said wheels being parallel to said surface.

2. The invention recited in claim 1 wherein said leg portions of said U-shaped housing extend into cooperating openings in said bracket.

3. The invention recited in claim 2 wherein said leg portions on said U-shaped housing and said flanges on said bracket having substantially the same lateral dimension.

* * * * *